United States Patent

[11] 3,544,734

[72] Inventor Larned A. Meacham
Bainbridge Island, Washington
[21] Appl. No. 783,513
[22] Filed Dec. 13, 1968
[45] Patented Dec. 1, 1970
[73] Assignee Bell Telephone Laboratories, Incorporated
Murray Hill, New Jersey
a corporation of New York

[54] NEGATIVE IMPEDANCE BOOSTED TRANSMISSION SYSTEM
6 Claims, 2 Drawing Figs.

[52] U.S. Cl. .......... 179/170, 307/322
[51] Int. Cl. .......... H04b 3/16, H04b 3/36
[50] Field of Search .......... 179/170, 170(D), 170(T), 170(U), 170(NHC); 307/322

[56] References Cited

UNITED STATES PATENTS

| | | | |
|---|---|---|---|
| 3,124,648 | 3/1964 | Miller.......... | 179/170UX |
| 3,439,120 | 4/1969 | Levine.......... | 179/170UX |

*Primary Examiner*—Kathleen H. Claffy
*Assistant Examiner*—William A. Helvestine
*Attorneys*—R. J. Guenther and E. W. Adams, Jr.

ABSTRACT: A two wire negative impedance boosted transmission system capable of simultaneous transmission in either direction wherein identical constant current sources are symmetrically placed at each terminal so as to supply constant bias current to the negative impedance booster units without interfering with the hybrid balance at the terminals.

INVENTOR
L.A. MEACHAM
BY John P. MacDonnell
ATTORNEY

NEGATIVE IMPEDANCE BOOSTED TRANSMISSION SYSTEM

BACKGROUND OF THE INVENTION

This invention relates to negative impedance boosted transmission systems and, more particularly, to terminal arrangements for negative impedance boosted transmission systems which permit the transmission of signals right down to d.c.

My U.S. Pat. Nos. 3,384,844 and 3,392,344 describe negative impedance booster (NIB) units which, when added to a transmission line, open new possibilities of using the same frequency band simultaneously in both directions for two wire carrier or pulse transmission. These possibilities are due to the properties of zero transmission loss, linear phase, and constant resistive image impedance as approximated by a cable pair equipped with NIB units.

Such a transmission system has proved to be especially efficient in the case of simultaneous pulse transmission in both directions over two wires where the transmission line has been found to act as both a pulse shaper and transmission medium. With this system, separation of the signals is preferably accomplished at each terminal by the use of balanced hybrid networks. Although some flexibility is permitted in the balance of these networks due to the low transmission loss in the line, the hybrids must nevertheless be sufficiently balanced to permit separation of the transmitted and received signals, notably when the components of such signals extend down to d.c.

The NIB units in the transmission line require a constant bias current source for their operation. Constant current sources, however, normally present a very high impedance instead of the proper line terminating impedance necessary for hybrid balance. Shunting the current sources with a low impedance bypass, such as a resistor in series with a coupling capacitor, introduces hybrid unbalance errors due to the charging and discharging of the coupling capacitor. Significant errors may thereby be introduced, notably during pulse transmission. These errors destroy the capability of the system to both transmit simultaneously in both directions and transmit pulses on a d.c. basis without the necessity of modulating and demodulating a carrier.

It is, therefore, an object of this invention to provide a two wire NIB cable transmission system with hybrid balance for separation of signals which is capable of transmission right down to d.c.

SUMMARY OF THE INVENTION

The present invention is directed to a negative impedance boosted transmission system capable of simultaneous bilateral transmission down to d.c. over two wires. Each terminal of this system comprises a constant current source to supply the NIB units and a hybrid network which is balanced so as to separate the received signals from the transmitted signals. A capacitor is effectively connected in series with an impedance matching element such as a resistor across the constant current source, which normally presents a high impedance, to lower the impedance presented by the current source in such a way as to sustain the hybrid balance at the receiving and transmitting networks and at the same time supply power to the NIB units connected to the line. By symmetrically connecting the constant current source at each terminal to opposite wires of the two wire system and receiving substantially half of the transmitted signal from each wire the effects of charging and discharging the capacitor during pulse or extremely low frequency transmission is eliminated and transmission right down to d.c. is made possible.

BRIEF DESCRIPTION OF THE DRAWING

Other objects and features of the present invention will become apparent upon consideration of the following detailed description when taken in connection with the accompanying drawings in which.

DETAILED DESCRIPTION

Figure 1:
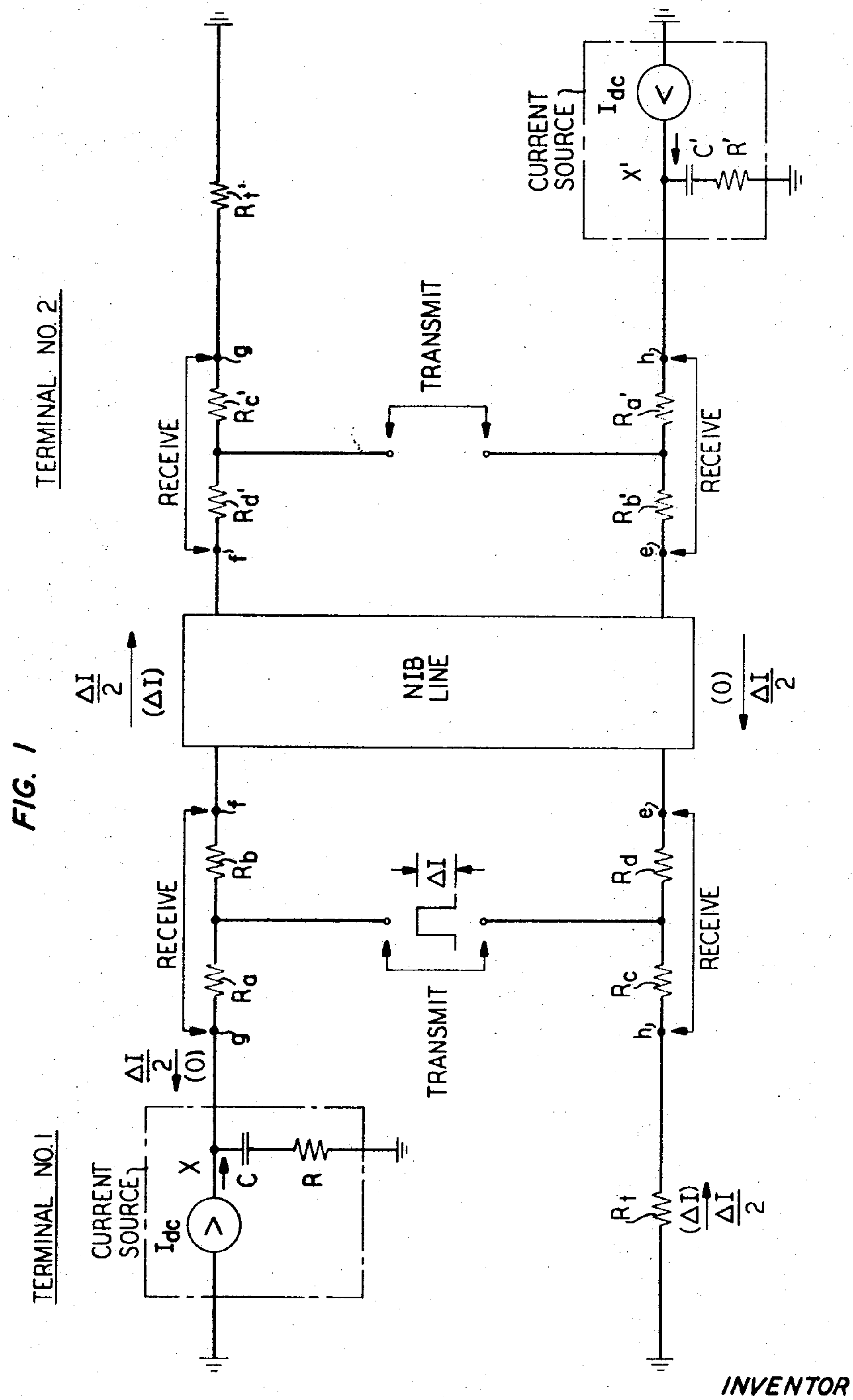
FIG. 1 is a simplified diagram of an NIB transmission system employing the present invention.

A simplified diagram of an NIB transmission system employing the present invention is shown in FIG. 1. In FIG. 1, two symmetrical terminals labeled terminal No. 1 and terminal No. 2 are shown connected to either side of a two wire NIB line. Both terminals terminate in a d.c. hybrid balanced network represented by resistors $R_a$, $R_b$, $R_c$, and $R_d$ at terminal No. 1 and resistors $R_a'$, $R_b'$, $R_c'$, and $R_d'$ at terminal No. 2. In a typical embodiment, these resistors are all made equal. In addition, resistors $R_t$ and $R_t'$, which respectively may be equal to half the midspacing image impedance of the NIB line, are employed as terminating elements. As discussed in detail hereinafter, substantially half the received signal is taken from each of the two wires and the value of a voltage received at one or the other of the hybrid networks may be expressed by the equation:

$$V_{rec}=(V_g-V_f)+(V_e-V_h)$$

where $V_e$, $V_f$, $V_g$, and $V_h$ represent the voltages measured at points *e*, *f*, *g*, and *h* of FIG. 1 with respect to some common point such as ground. The impedance presented by the current source at each of the terminals is illustratively represented by a coupling capacitor C in series with a resistor R preferably equal in value to $R_t$ (or $R_t'$). As noted heretofore, the impedance presented by the current sources is chosen to maintain the necessary degree of hybrid balance for simultaneous bilateral transmission over two wires while still providing the constant current necessary for the NIB units. As was noted, however, unless the effects of the capacitance presented by the current source are corrected, hybrid unbalance errors are introduced.

The problem due to the capacitance can most easily be seen by assuming that a current pulse (or increment, or step function) having a magnitude $\Delta I$ is introduced at the transmitting terminals of terminal No. 1. Due to hybrid balance, half of this pulse $\frac{\Delta I}{2}$ will initially pass through resistor $R_b$ and into the NIB line, while half the pulse $\frac{\Delta I}{2}$ will pass through resistor $R_a$ and the resistive-capacitive impedance presented by the current source of terminal No. 1. At terminal No. 2, by virtue of lossless transmission over the NIB line, the current through resistors $R_d'$ and $R_c'$ will be $\frac{\Delta I}{2}$, while the current through resistors $R_a'$ and $R_b'$ will, due to the symmetry of the hybrid termination, also be $\frac{\Delta I}{2}$. The voltage $V_{rec}$ received at terminal No. 2 will, as noted heretofore, be a sum and difference combination of the voltages at points *e*, *f*, *g*, and *h* and will proportionately correspond to the transmitted current increment $\Delta I$. Were it not for the extra current source at terminal No. 2, the charging action of the capacitor at terminal No. 1 would destroy the hybrid balance effect and distort the pulse transmission. However, the current source at terminal No. 2, which is symmetrically disposed with and identical to the current source at terminal No. 1, effectively preserves the hybrid balance at all frequencies in the following manner.

As noted, when a pulse having a magnitude $\Delta I$ is introduced at terminal No. 1 half the pulse magnitude $\frac{\Delta I}{2}$ flows through resistor $R_a$ toward point X to charge capacitor C. The total current at point X readjusts in a relatively short interval of time (with a time constant proportional to C) to the magnitude $I_{dc}$, due to the action of the current source which always restores the total current at point X toward the constant value $I_{dc}$. In other words the initial increment of current $\frac{\Delta I}{2}$ through resistor $R_a$ drifts exponentially to zero. (The values to which the current increments in the system drift after the initial response to the introduction of the ΔI pulse are shown on FIG. 1 in parentheses.) Since the applied magnitude ΔI of the pulse is still present at this time, the magnitude of the pulse sent over the upper wire of the NIB line to terminal No. 2 must now be ΔI. Simultaneously with this action, the current source at terminal No. 2 adjusts the total current at point X′ to $I_{dc}$, causing the pulse current in the lower wire of the NIB line to decay to zero in the same manner that the increment at point X in the current source of terminal No. 1 decayed to zero. The increment through resistor $R_t'$ now rises from $\frac{\Delta I}{2}$ to ΔI as does the pulse current through resistor $R_t$. Since the voltage received at terminal No. 2 is, as noted heretofore, expressed by the equation:

$$V_{rec}=(V_g-V_f)+(V_e-V_h)$$

and the time constant of the impedance presented by the current sources is the same at the two terminals, the drop in the voltage $V_e-V_h$ in the lower wire is exactly compensated during the initial interval when the $\frac{\Delta I}{2}$ current appears at point X by the rise of voltage $V_g-V_f$ in the upper wire. The received voltage $V_{rec}$ is thus maintained exactly proportional to the input signal ΔI transmitted at terminal No. 1. The proportionality is maintained once the initial interval is past and a pulse ΔI may thus be transmitted without distortion due to the capacitance of the current sources. Were it not for the symmetrical current source arrangement, the signal received at terminal No. 2 would not duplicate in waveform the signal transmitted at terminal No. 1.

Since the system is linear and symmetrical and has substantially no transmission losses, due to the benefits obtained with NIB units, a different increment ΔI ′ can be sent similarly and simultaneously (due to the degree of hybrid balance maintained), or separately, from terminal No. 2 to terminal No. 1. The transmitted signal may comprise any frequency in a band that extends right down to d.c.

Figure 2:
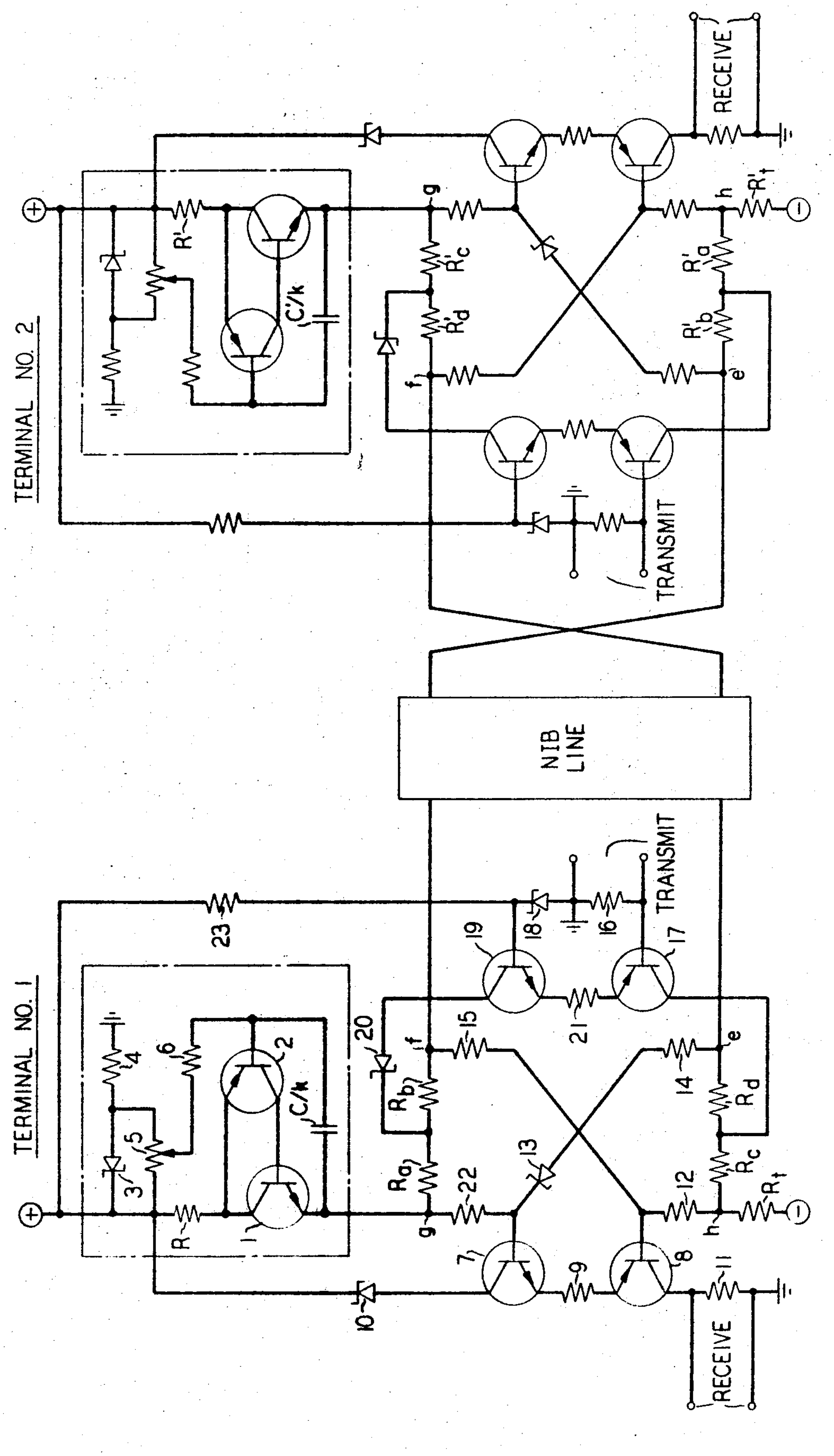
FIG. 2 is a schematic embodiment of the invention.

The present invention is shown in further detail in FIG. 2. Since terminal No. 1 and terminal No. 2 are identical, only terminal No. 1 will be discussed. The designations R, $R_a$, $R_b$, $R_c$, $R_d$, and $R_t$ used for FIG. 1 have been retained in FIG. 2 to designate the same components. The capacitor $\frac{C}{k}$ of FIG. 2 is related in value by the factor $k$ to the capacitor C of FIG. 1. The current source in FIG. 2 is shown in a dotted enclosure and comprises transistors 1 and 2 interconnected for increased gain with the collector electrode of transistor 2 connected to the base electrode of transistor 1 and the emitter electrode of transistor 2 connected to the collector electrode of transistor 1. Resistor R is serially connected with the collector-emitter path of transistor 1 between a source of positive potential and resistor $R_a$ of the hybrid network. The current through resistor R is regulated by emitter feedback to be proportional to the voltage at the base electrode of transistor 2. Constant reference bias is provided for the base electrode of transistor 2 by the network including zener diode 3, resistor 4, and potentiometer 5. The zener diode 3 is serially connected with resistor 4 in the zener or reverse direction from the source of positive potential to ground to provide a constant reference potential. Potentiometer 5 is connected across zener diode 3 with its wiper arm serially connected by resistor 6 to the base electrode of transistor 2 to provide an adjustment for the bias or d.c. potential at the base of transistor 2. For reasons discussed in connection with FIG. 1, resistor R is chosen to be approximately one-half the midspacing image impedance of the NIB line. To maintain hybrid balance resistor $R_t$ will normally be chosen to be equal to resistor R. The impedance presented by the current source to the hybrid network (from point $g$ to ground) is equal in value to resistor R in series with a virtual capacitance C. By well-known feedback action this capacitance is made greater than that of the element $\frac{C}{k}$ shown in FIG. 2 by the factor $k$, which is roughly the ratio of resistor 6 to resistor R.

Output amplification is provided by transistors 7 and 8. The emitters of transistors 7 and 8 are interconnected by resistor 9 which is chosen to provide proper gain by emitter feedback. Zener diode 10 has its cathode electrode connected to the source of positive potential and its anode electrode connected to the collector electrode of transistor 7 to adjust the collector bias for transistor 7. The signal from terminal No. 2 is received across resistor 11 which is connected from the collector electrode of transistor 8 to ground.

As discussed in connection with FIG. 1 the incoming signal is advantageously taken from points $f$ and $g$, and $e$ and $h$. With the impedances of the hybrid balanced properly, the transmitted signal introduced between the junction of resistors $R_a$ and $R_b$ and the junction of resistors $R_c$ and $R_d$ will so divide that points $f$ and $g$ and also $e$ and $h$ will be equipotential pairs of points for outgoing signals but will additively register incoming signals. As discussed hereinafter, by cross-connecting these points as shown in FIG. 2, there is the required separation of the transmitted and received signals and, moreover, an additional balance associated with d.c. coupling.

Resistor 22 connects point $g$ to the base electrode of transistor 7, while resistor 12 connects point $h$ to the base electrode of transistor 8. These resistors and resistors 14 and 15 are chosen to average the incoming signal received at points $e$, $f$, $g$, and $h$ without interference with the degree of hybrid balance necessary for transmission over two wires. The series combination of zener diode 13 and resistor 14 connects the base electrode of transistor 7 to point $e$. Zener diode 13 is poled for conduction in the zener direction from the base electrode of transistor 7 toward point $e$ to provide a bias level adjustment. Resistor 15 connects the base electrode of output amplifier transistor 8 to point $f$. The input signal received at points $e$, $f$, $g$, and $h$ by transistors 7 and 8 is thus applied to the base electrodes of these transistors and averaged by the transistor network to produce a received signal which reproduces the transmitted signal. With this arrangement, a ground or similar reference is not required and only the sum and difference in the received signal at points $e$, $f$, $g$, and $h$ in accordance with the expression $V_{rec}=(V_g-V_f)+(V_e-V_h)$ is amplified by transistors 7 and 8. If a pulse sequence always averaged the same over short or long time intervals (thus having no d.c. component) and the terminating networks were properly balanced, the correction introduced by the cross-coupling arrangement of transistors 7 and 8 would not be necessary. In general, however, the running average of a pulse sequence changes with time, and the current source regulations react to the changes by a redistribution of their direct currents. In the present invention, the cross-coupling arrangement of transistors 7 and 8 corrects for this redistribution.

The transmitter at each terminal is connected across resistor 16. Resistor 16 is, in turn, connected between ground and the base electrode of input transistor 17. Zener diode 18 is connected from the base electrode of input transistor 19 and ground and poled for zener conduction from the base electrode to ground. The voltage across zener diode 18 provides a reference bias voltage at the base electrode of transistor 19. Resistor 23 connects the cathode electrode of zener diode 18 to the source of positive potential to maintain continuous zener conduction through the diode. The collector electrode of transistor 17 is connected to the junction of resistors $R_c$ and $R_d$, while the collector electrode of transistor 19 is connected to the junction of resistors $R_a$ and $R_b$ by zener diode 20. Zener diode 20 provides an adjustment of collector bias for input transistor 19 and is poled for zener conduction from the junction of resistors $R_a$ and $R_b$ to the collector electrode of transistor 19. Resistor 21 interconnects the emitter electrodes of input transistors 17 and 19.

As noted, zener diode 18 provides a reference voltage at the base electrode of transistor 19. The signal to be transmitted is applied across resistor 16 which is connected to the base electrode of transistor 17 and ground. The combination of transistors 17 and 19 acts as an amplifier which transmits the difference between the reference voltage at the base of transistor 19 and the signal at the base of transistor 17 to the junction of resistors $R_a$ and $R_b$, and $R_c$ and $R_d$. Using this arrangement, only the difference signal between the base electrodes of the transistors, with gain established by the emitter feedback resistor 21, controls the amplifier regardless of the condition at the input terminals, e.g. off ground, etc.

In summary, then, the use of improved NIB units such as described in my U.S. Pat Nos. 3,384,844 and 3,392,344 provides for very low loss transmission over two wires and permits some flexibility in the degree of hybrid balance required for simultaneous bilateral transmission. NIB units, however, generally require a constant current supply, and this must present a relatively low impedance to incoming signals, which may approach d.c., so as not to affect hybrid balance necessary to separate the received from the transmitted signal. To obtain this impedance it is often necessary to employ a capacitor which changes its state of charge in response to a d.c. input signal and effectively provides an undesirable unbalance in the hybrid network. The present invention overcomes the effect of this capacitor by symmetrically disposing current sources at either terminal and advantageously receiving the transmitted signal from both wires of the two wire NIB transmission system. Transmission right down to d.c. may thus be obtained.

The above-described arrangement is illustrative of the application of the principles of the invention. Other embodiments may be devised by those skilled in the art without departing from the spirit and scope thereof.

I claim:

1. A two wire transmission system capable of simultaneous transmission in either direction having first and second terminals interconnected by a negative impedance boosted line, each of said first and second terminals comprising at least substantially identical sources of constant current, one of said sources being connected to one wire of said two wires at one terminal while the other of said sources at said second terminal is connected to the other wire of said two wires in a symmetrical arrangement, said constant current sources presenting a relatively low impedance to incoming signals so as not to distort simultaneous transmission on said two wire system.

2. A two wire transmission system in accordance with claim 1 wherein a capacitor is connected across the output of each of said constant current sources, said capacitor having an a.c. impedance sufficiently low to cause said constant current sources to present a relatively low impedance at their respective terminals.

3. A two wire transmission system in accordance with claim 2 wherein each terminal comprises a hybrid network balanced with the impedance of said current sources so as to prevent appreciable distortion between transmitted and received signals.

4. A two wire transmission system capable of simultaneous transmission in either direction having first and second terminals interconnected by a negative impedance boosted line, each of said terminals comprising at least substantially identical sources of constant current which present a relatively low impedance and a hybrid network, one of said sources being connected to one wire of said two wires at one terminal while the other of said sources at said second terminal is connected to the other wire of said two wires in a symmetrical arrangement, each hybrid network being connected so as to receive substantially half the transmitted signal from one wire of said two wires and substantially the remaining half of the transmitted signal from the other of said two wires, and individual pulse transmitting means connected to each of said hybrid networks to simultaneously transmit pulses in both directions of said two wires.

5. A two wire transmission system in accordance with claim 4 wherein a capacitor is connected across the output of each of said constant current sources, said capacitor presenting an impedance which does not interfere with the balance of said hybrid networks necessary for the separation of simultaneously transmitted and received signals.

6. A two wire transmission system in accordance with claim 5 comprising first and second transistors each having base, collector, and emitter electrodes, means connecting the collector electrode of said first transistor to a source of positive potential, a receiver connected between the collector electrode of said second transistor and the ground terminal of said source of positive potential, a resistor interconnecting the emitter electrodes of said first and second transistors, said hybrid networks having first, second, third and fourth terminals, said first and second terminals being connected to one wire of said two wire system, and said third and fourth terminals being connected to the other wire of said two wire system, means connecting the base electrode of said first transistor to said second and third terminals of said hybrid network, and means connecting the base electrode of said second transistor to said first and fourth terminals of said hybrid network whereby substantially separate halves of the transmitted signal are received by each of said first and second transistors and combined for transmission to said receiver.